(12) United States Patent
Knoener et al.

(10) Patent No.: US 11,504,789 B2
(45) Date of Patent: Nov. 22, 2022

(54) SYSTEMS AND METHODS TO CONTROL PULSE WELDING

(71) Applicant: Illinois Tool Works Inc., Glenview, IL (US)

(72) Inventors: Craig Steven Knoener, Appleton, WI (US); Lucas Charles Johnson, Appleton, WI (US); Zach W. MacMullen, Larsen, WI (US); Charles Ace Tyler, Neenah, WI (US); Christine Dong, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 357 days.

(21) Appl. No.: 16/653,503

(22) Filed: Oct. 15, 2019

(65) Prior Publication Data

US 2020/0122263 A1   Apr. 23, 2020

Related U.S. Application Data

(60) Provisional application No. 62/748,041, filed on Oct. 19, 2018.

(51) Int. Cl.
*B23K 9/095* (2006.01)
*B23K 9/09* (2006.01)
*B23K 9/10* (2006.01)

(52) U.S. Cl.
CPC .............. *B23K 9/095* (2013.01); *B23K 9/091* (2013.01); *B23K 9/1043* (2013.01)

(58) Field of Classification Search
CPC ........ B23K 9/095; B23K 9/091; B23K 9/092; B23K 9/093; B23K 9/0953; B23K 9/1006; B23K 11/24; B23K 11/241
See application file for complete search history.

(56) References Cited

U.S. PATENT DOCUMENTS 9,403,231 B2 *  8/2016  Hutchison .............. B23K 9/095
10,040,143 B2 *  8/2018  Davidson .............. B23K 9/1012
(Continued)

FOREIGN PATENT DOCUMENTS

CN   106944716    7/2017
GB     644617    10/1950

*Primary Examiner* — Brian W Jennison
(74) *Attorney, Agent, or Firm* — McAndrews, Held & Malloy, Ltd.

(57) ABSTRACT

Systems and methods to control pulse welding are disclosed. An example welding-type system includes: power conversion circuitry configured to convert input power to welding-type power; and control circuitry configured to control the power conversion circuitry to output the welding-type power in a plurality of pulse cycles, each pulse cycle including background, ramp up, peak, and ramp down phases. Controlling the power conversion circuitry involves: during the background phase, controlling the power conversion circuitry in a voltage-controlled mode using a background voltage as a target voltage; during the ramp up phase, controlling the power conversion circuitry by changing the target voltage to a peak voltage; during the peak phase, controlling the power conversion circuitry using the peak voltage as the target voltage; and during the ramp down phase, controlling the power conversion circuitry by changing the target voltage to the background voltage.

19 Claims, 3 Drawing Sheets

(56) References Cited

U.S. PATENT DOCUMENTS

| | | | | |
|---|---|---|---|---|
| 10,464,155 B2* | 11/2019 | Davidson | ................ | B23K 9/09 |
| 2014/0131330 A1 | 5/2014 | Madsen | | |
| 2016/0288235 A1* | 10/2016 | Davidson | ............... | B23K 9/173 |
| 2016/0318112 A1* | 11/2016 | Hutchison | .............. | B23K 9/095 |
| 2017/0151621 A1* | 6/2017 | Klegin | ................... | B23K 9/092 |

* cited by examiner

SYSTEMS AND METHODS TO CONTROL PULSE WELDING

RELATED APPLICATIONS

This patent claims priority to U.S. Provisional Patent Application Ser. No. 62/748,041, filed Oct. 19, 2018, entitled "Systems and Methods to Control Pulse Welding." The entirety of U.S. Provisional Patent Application Ser. No. 62/748,041 is incorporated herein by reference.

TECHNICAL FIELD

This disclosure relates generally to welding-type power supplies and, more particularly, to systems and methods control pulse welding.

BACKGROUND

Welding-type components (e.g., welding torches) are sometimes powered by welding-type power supplies. Conventional power supplies use a range of electrical components and/or electrical circuitry to produce appropriate welding-type power for various welding-type operations and/or welding-type components.

One known welding process is a pulsed MIG process. A pulsed MIG process typically has a cyclical output having at least a peak phase with a relatively high current and a background phase with a relatively low current. There is often an abrupt change in slope from the beginning and end of the peak and background phases.

SUMMARY

The present disclosure is directed to systems and methods to control pulse welding, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
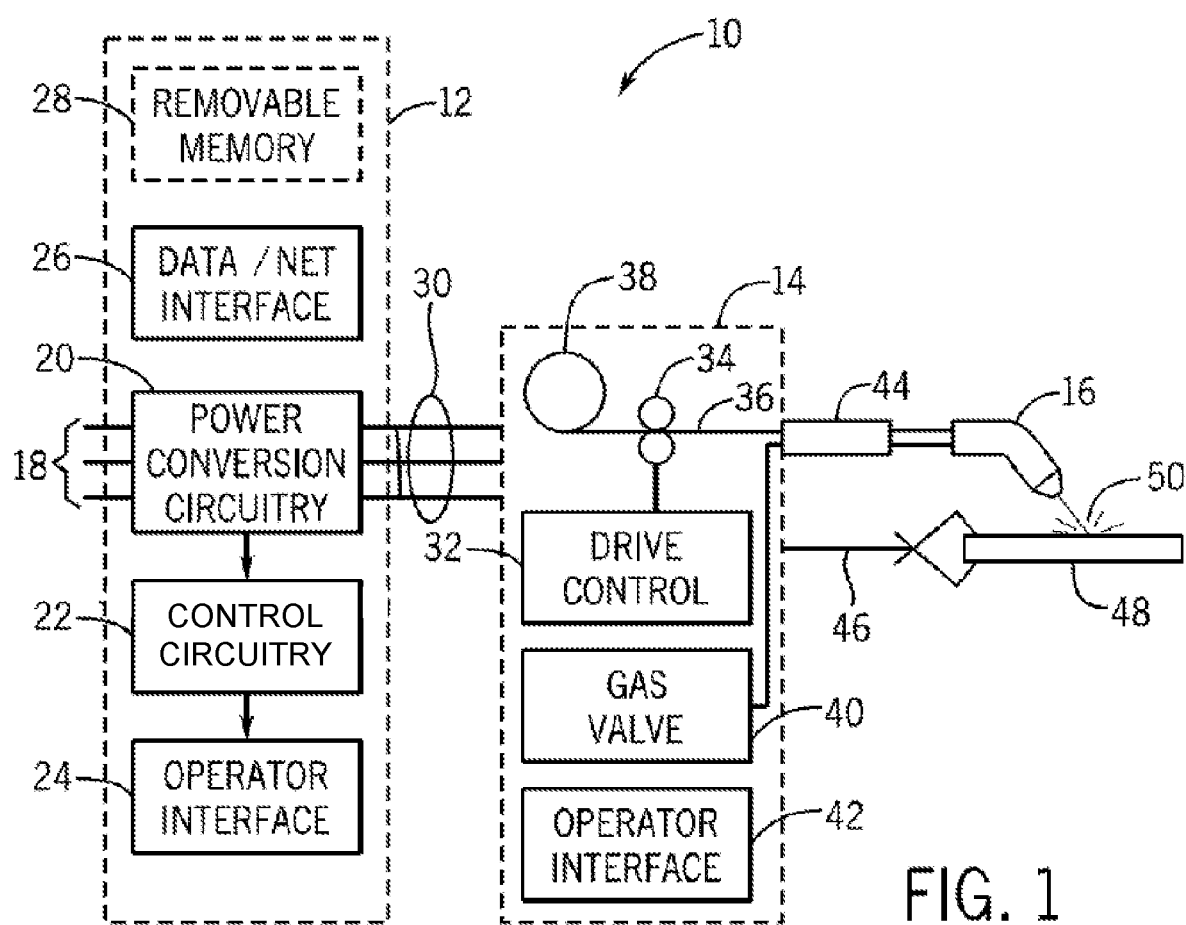
FIG. 1 is a diagram of an example welding-type system in accordance with aspects of this disclosure.

Pulse welding, as used herein, includes welding with output power that is generally pulsed between a greater peak and a lesser background, at a controllable frequency and in a substantially constant arc state (e.g., occasional, inadvertent shorts may occur). A pulse cycle, as used herein, includes a background phase, a ramp up (e.g., transition) phase from the background to a peak, a peak phase, and a ramp down (e.g., transition) phase from the peak to the background. Example pulse cycles occur on the order of milliseconds or tens of milliseconds. However, pulse cycles can include other phases as well, and/or control circuitry may use a state-based control scheme in which, under certain circumstances, a typical phase order (e.g., background, then ramp up, then peak, then ramp down) is modified.

During conventional pulse welding processes, a weld controller controls the output current, which results in a weld voltage waveform. In the absence of short circuits, the weld voltage waveform follows the shape of the output current waveform. Conventional pulse welding processes include a succession of pulse cycles, in which each pulse cycle includes: a background phase, a ramp up (e.g., background-to-peak) phase, a peak phase, and ramp down (e.g., peak-to-background) phase. During the peak phase and the background phase, the weld controller may be regulating either weld current or weld voltage. During the ramp up phase, in conventional pulse processes, the weld controller increases the current at a defined ramp rate (e.g., in units of amperes per millisecond (A/ms)). Conversely, during the ramp down phase, the weld controller decreases the current at a defined ramp rate (e.g., in units of A/ms).

In conventional pulse welding processes, the four phases are all current-controlled, or the ramping phases are current-controlled and the peak and background phases are voltage-controlled. During the peak state, conventional weld controllers use a voltage target and a peak inductance corresponding to the peak phase. The weld controller compares the weld voltage feedback to the voltage target, and increases or decreases the weld current based on the comparison. The actual change in current is determined by the inductance. Conventional pulse welding processes have current and voltage waveforms having relatively sharp edges. Fourier analysis teaches that sharp edges require adding of the odd harmonic frequencies to the fundamental frequency. Although the pulse process fundamental frequency ranges from 50 to 400 Hz, the odd harmonics can extend all the way through the audible range, which can result in unpleasant noise during conventional pulse waveforms.

Disclosed examples enable rounding of the edges of the weld current waveform, which lowers the magnitude of the odd harmonics, thereby resulting in a quieter and/or less unpleasant-sounding arc. Some disclosed examples provide a simplified voltage-controlled pulse cycle which rounds off the edges of the pulse weld current.

Examples of the present disclosure may be described herein below with reference to the accompanying drawings. In the following description, well-known functions or constructions are not described in detail because they may obscure the disclosure in unnecessary detail. For this disclosure, the following terms and definitions shall apply.

As used herein, the term "output inductance" refers to a physical or simulated welding parameter, and is representative of a rate of change of the output current, such as a rate of execution by a control loop or equivalent processing effect, and/or by changing the physical output inductance of the circuitry.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general-purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating. As used herein, a welding-type power supply refers to any device capable of, when power is applied thereto, supplying suitable power for welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example welding-type systems include: power conversion circuitry configured to convert input power to welding-type power; and control circuitry configured to control the power conversion circuitry to output the welding-type power in a plurality of pulse cycles, each pulse cycle comprising a background phase, a ramp up phase, a peak phase, and a ramp down phase. The controlling of the power conversion circuitry involves: during the background phase of the pulse cycles, controlling the power conversion circuitry in a voltage-controlled mode using a background voltage as a target voltage; during the ramp up phase of the pulse cycles, controlling the power conversion circuitry in the voltage-controlled mode by changing the target voltage to a peak voltage; during the peak phase of the pulse cycles, controlling the power conversion circuitry in the voltage-controlled mode using the peak voltage as the target voltage; and during the ramp down phase of the pulse cycles, controlling the power conversion circuitry in the voltage-controlled mode by changing the target voltage to the background voltage.

In some examples, the control circuitry is configured to change the target voltage from the background voltage to the peak voltage instantaneously at the start of the ramp up phase. In some examples, the control circuitry is configured to change the target voltage from the peak voltage to the background voltage instantaneously at the start of the ramp down phase. In some examples, the control circuitry is configured to control the power conversion circuitry in the voltage-controlled mode by controlling the power conversion circuitry based on comparing an output voltage of the power conversion circuitry to the target voltage.

In some examples, the control circuitry is configured to: control the power conversion circuitry using a first output inductance during the peak phase and the background phase; and control the power conversion circuitry using a second output inductance during the ramp up phase and the ramp down phase. In some such examples, the second output inductance is higher than the first output inductance. In some examples, the second output inductance is lower than the first output inductance. In some example systems, the control circuitry is configured to adjust the second output inductance based on at least one of an output voltage at an end of the peak phase, a time at which the output voltage was within a threshold voltage of the peak voltage during the peak phase, or a voltage overshoot of the peak voltage or the background voltage.

In some example systems, the control circuitry is configured to control the power conversion circuitry using the first output inductance by controlling an output current based on a first relationship between an output voltage of the power conversion circuitry and rate of output current change, and control the power conversion circuitry using the second output inductance by controlling an output current based on a second relationship between the output voltage of the power conversion circuitry and the rate of output current change.

Disclosed example welding-type systems include: power conversion circuitry configured to convert input power to welding-type power; and control circuitry configured to control the power conversion circuitry to output the welding-type power in a plurality of pulse cycles, each pulse cycle comprising a background phase, a ramp up phase, a peak phase, and a ramp down phase, wherein the controlling the power conversion circuitry comprises controlling the power conversion circuitry in a voltage-controlled mode by changing a target voltage based on which of the background phase, the ramp up phase, the peak phase, or the ramp down phase of the pulse cycle is being controlled.

Disclosed example methods for pulse welding involve: controlling, via control circuitry, power conversion circuitry to convert input power to output welding-type power in a plurality of pulse cycles, each pulse cycle comprising a background phase, a ramp up phase, a peak phase, and a ramp down phase. The controlling of the power conversion circuitry involves: during the background phase of the pulse cycles, controlling the power conversion circuitry in a voltage-controlled mode using a background voltage as a target voltage; during the ramp up phase of the pulse cycles, controlling the power conversion circuitry in the voltage-controlled mode by changing the target voltage to a peak voltage; during the peak phase of the pulse cycles, controlling the power conversion circuitry in the voltage-controlled mode using the peak voltage as the target voltage; and during the ramp down phase of the pulse cycles, controlling the power conversion circuitry in the voltage-controlled mode by changing the target voltage to the background voltage.

In some example methods, changing the target voltage to the peak voltage occurs at the start of the ramp up phase. In some example methods, changing the target voltage to the background voltage occurs at the start of the ramp down phase. In some examples, controlling the power conversion circuitry in the voltage-controlled mode involves controlling the power conversion circuitry based on comparing an output voltage of the power conversion circuitry to the target voltage.

In some example methods, the controlling of the power conversion circuitry involves controlling the power conversion circuitry using a first output inductance during the peak phase and the background phase, and controlling the power conversion circuitry using a second output inductance during the ramp up phase and the ramp down phase. In some examples, the second output inductance is higher than the first output inductance. In some examples, the second output inductance is lower than the first output inductance.

Some example methods further involve adjusting the second output inductance based on at least one of an output voltage at an end of the peak phase, a time at which the output voltage was within a threshold voltage of the peak voltage during the peak phase, or a voltage overshoot of the peak voltage or the background voltage. In some examples, the controlling of the power conversion circuitry using the first output inductance involves controlling an output current based on a first relationship between an output voltage of the power conversion circuitry and rate of output current change, and the controlling of the power conversion circuitry using the second output inductance involves controlling an output current based on a second relationship between the output voltage of the power conversion circuitry and the rate of output current change.

FIG. 1 is a diagram of an example welding-type system 10 in accordance with aspects of this disclosure. The example welding-type system 10 is a GMAW (gas metal arc welding) system, and in particular a MIG welding system. However, the example system 10 may perform flux cored arc welding (FCAW) and/or other wire-fed weld processes. In the example of FIG. 1, the system 10 includes a power supply 12 configured to receive and convert input power to welding-type power, which is output to a wire feeder 14. The wire feeder delivers the power to a welding torch 16 to perform a welding operation.

The power supply 12 receives input power 18 from any suitable source, such as the power grid, an engine-generator set, hybrid power supplies, fuel cells, batteries, and/or any combination of these input power sources and/or other power sources. Power conversion circuitry 20 converts the input power 18 to welding-type power. The power supply 12 may be designed to carry out multiple different welding processes that can be selected by an operator, and the power conversion circuitry 20 includes components, such as solid state switches discussed below, that allow for power conversion in accordance with the desired process. Control circuitry 22 is coupled to the power conversion circuitry 20 and controls the operation of the power conversion circuitry during the selected process. For example, the control circuitry 22 may provide signals that regulate the conductive states of solid state switches within the power conversion circuitry to produce the desired output power, as also discussed below. In many applications the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. The processes and other welding parameters may be selected via an operator interface 24 that is coupled to the control circuitry 22. The power supply 12 may further include communications circuitry that allows for communications with remote or networked components and systems, illustrated as data/network interface 26 in FIG. 1. Such communications circuitry may allow for monitoring of welding operations, logging of weld data, downloading or configuration of new processes and updates to processes, and so forth. Finally, the power supply 12 will sometimes include removable memory 28 that may be used for storing processes, process parameters, system updates, and any suitable data.

The example system 10 includes a wire feeder 14 which may be separate from and/or integrated into the power supply 12 (e.g., contained within a housing of the power supply 12). In the illustrated example, power and/or data may be transferred from the power supply 12 to the wire feeder 14 via one or more cables or cable bundles 30. The wire feeder 14 includes drive control circuitry 32 that regulates the operation of a drive assembly 34. Drive control 32 along with control circuitry 22 together are the controller for system 10. The controller may include other control modules as well. The drive assembly 34 contacts and feeds a wire electrode 36 to the welding operation. The wire electrode is typically stored on a spool 38 within the wire feeder. The wire feeder may also include one or more gas valves for providing shielding gas for a welding operation. Finally, an operator interface 42 may allow certain parameters of the wire feeder to be selected, such as wire feed speed. The power supply 12 and wire feeder 14 may operate in coordination so that wire and gas resources are fed to the welding operation when power is provided for welding at the initiative of the welding operator (e.g., via a control on the torch 16).

The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

The example power conversion circuitry 20 includes an input rectifier that converts AC power to DC power, a power factor correction boost circuit that receives the rectified input and provides a boosted bus to an isolated converter. The converter may be a dual two-switch interleaved forward converter, which may include an output rectifier and an output inductor. The wire feeder 14 feeds the wire at a rate set by the user, and the control circuitry 22 causes power conversion circuitry 20 to provide an output at the current necessary for that wire feed speed, and at the desired voltage.

Figure 2:
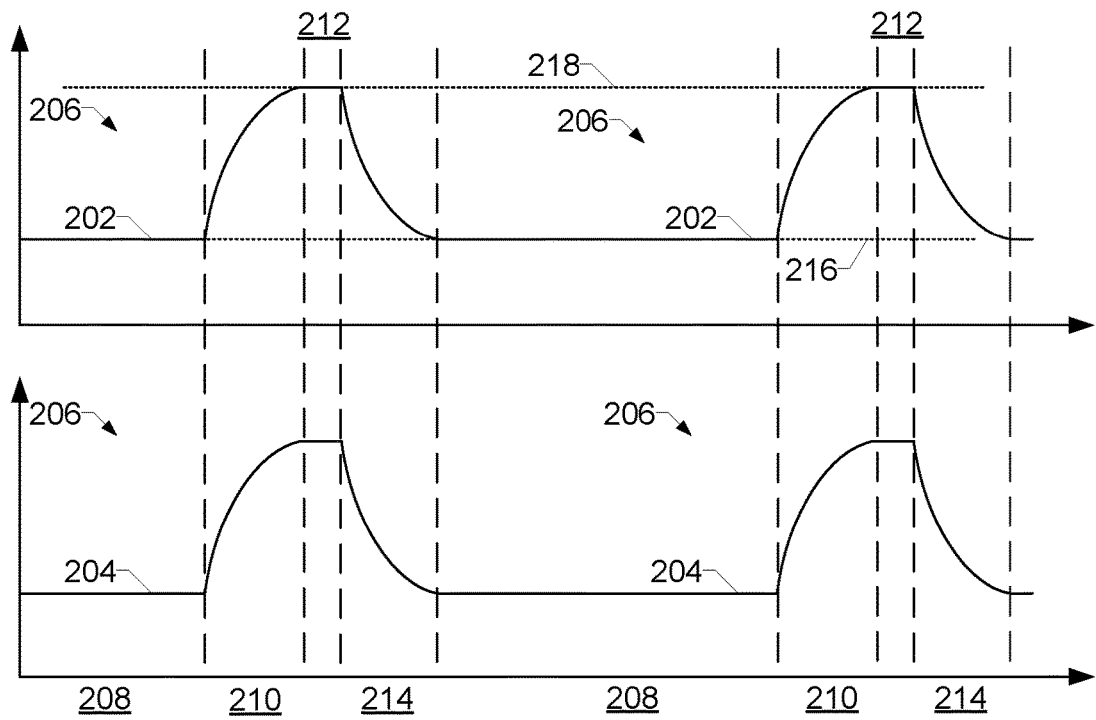
FIG. 2 illustrates an example output voltage waveform and an example output current waveform representative of an output from the power conversion circuitry of FIG. 1.

FIG. 2 illustrates an example output voltage waveform 202 and an example output current waveform 204 representative of an output from the power conversion circuitry 20 of FIG. 1. The example waveforms 202, 204 include example pulses 206, in which each of the pulses includes a background phase 208, a ramp up phase 210, a peak phase 212, and a ramp down phase 214.

The control circuitry 22 controls the power conversion circuitry 20 using a voltage-controlled control loop in each of the phases 208-214. In the example of FIGS. 1 and 2, the control circuitry 22 controls the target voltage of the control loop based on the phase 208-214 in which the pulse cycle is currently operating. For example, the ramp up phase 210 and the peak phase 212 use the same target voltage (e.g., the peak voltage), and the ramp down phase 214 and the background phase 208 use the same target voltage (e.g., the background voltage).

In an example of operation, during the background phase 208 the control circuitry 22 uses a background voltage 216 as the target voltage for the voltage-controlled control loop, and controls the output current based on comparing the output voltage of the power conversion circuitry 20 to the target voltage. The output voltage may be measured at the power conversion circuitry 20, at the output terminals of the power supply 12, at the torch 16 across the arc, and/or at any other suitable location. When the control circuitry 22 changes from the background phase 208 to the ramp up phase 210, the control circuitry 22 changes the target voltage to a peak voltage 218.

During the peak phase 212, the control circuitry 22 maintains the target voltage at the peak voltage 218. When the control circuitry 22 changes from the peak phase 212 to the ramp down phase 214, the control circuitry 22 changes the target voltage to the background voltage 216. Due to the output inductance of the power conversion circuitry 20, the execution of the control loop to achieve the target voltage results in a curved ramp up and a curved ramp down in both the current and voltage.

The dwell time at the peak voltage 218 and/or the background voltage 216 may depend, at least in part, on the inductance set by the control circuitry 22. In some examples, the control circuitry 22 also modifies the inductance based on the present phase 208-214. For example, the control circuitry 22 implements a first inductance during the ramp up phases 210 and the ramp down phases 214, and implements a second inductance during the background phases 208 and the peak phases 212. The control circuitry 22 may implement the inductance by, for example, controlling an execution or update rate at which the voltage-controlled control loop changes the current output from the power conversion circuitry 20, or an equivalent method such as selecting and enforcing timing delays in the control loop. Additionally or alternatively, the control circuitry 22 may change a physical output inductance of the power conversion circuitry 20 or another element in the weld circuit.

Figure 3:
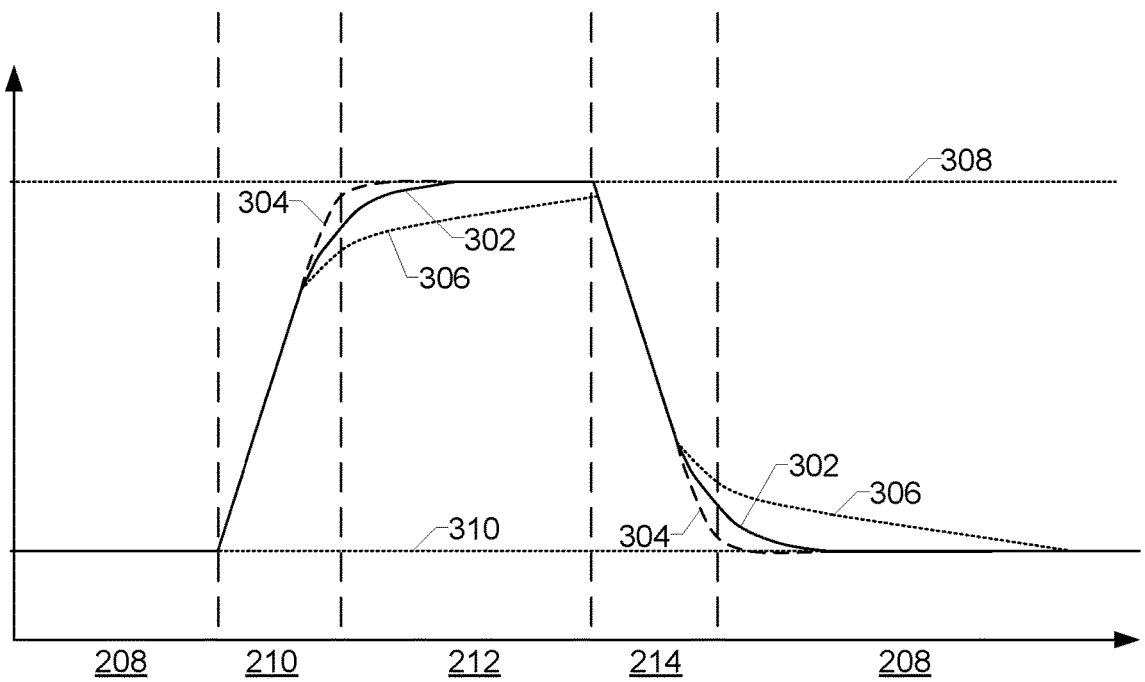
FIG. 3 illustrates example output pulse current waveforms representative of an output from the power conversion circuitry of FIG. 1 for different inductance parameters.

FIG. 3 illustrates example output pulse current waveforms 302, 304, 306, representative of an output current from the power conversion circuitry 20 of FIG. 1 for different inductance parameters controlled by the control circuitry 22. The example pulse current waveforms 302-306 represent an example pulse cycle, including the phases 208-214 of FIG. 2.

The example pulse current 302 represents a first inductance, in which the current is rounded (e.g., reduces slope as the output current approaches a nominal peak current 308 and/or as the output voltage approaches the nominal peak voltage). The example pulse current 304 represents a second inductance that is lower than the first inductance. As a result, the pulse current 304 approaches and reaches the peak current 308 more quickly than the pulse current 302, and has a longer dwell time at the peak current than the pulse current 304. Conversely, the pulse current 306 has a third inductance that is higher than the first inductance, and approaches the peak current 308 more slowly than the pulse current 302. As illustrated in FIG. 3, the pulse current 306 does not actually reach the peak current 308 before the control circuitry 22 changes to the ramp down phase 214, and has a longer dwell time at the peak current than the pulse current 304. The example pulse currents 302-306 similarly approach the background current 310 during the ramp down phase 214 at different speeds based on the inductance.

In some examples, the control circuitry 22 implements multiple control loops. For example, the control circuitry 22 may implement a general weld controller as an outer control loop and a current regulator as an inner control loop. The output of the outer control loop is the current target, which is the input of the current regulator in the inner control loop. If the current regulator is sufficiently slow, at the transition from the ramp down phase 214 to the background phase 208, the current regulator will undershoot (e.g., go below the and the actual weld current will be less than the desired target current. Furthermore, if a nominal background current 310 is relatively low, an undershoot can result in an arc outage, which is undesirable. The example control circuitry 22 can reduce or eliminate undershoots with relatively slow current regulators and/or can adjust the inductance to improve the speed of current regulation.

Figure 4:
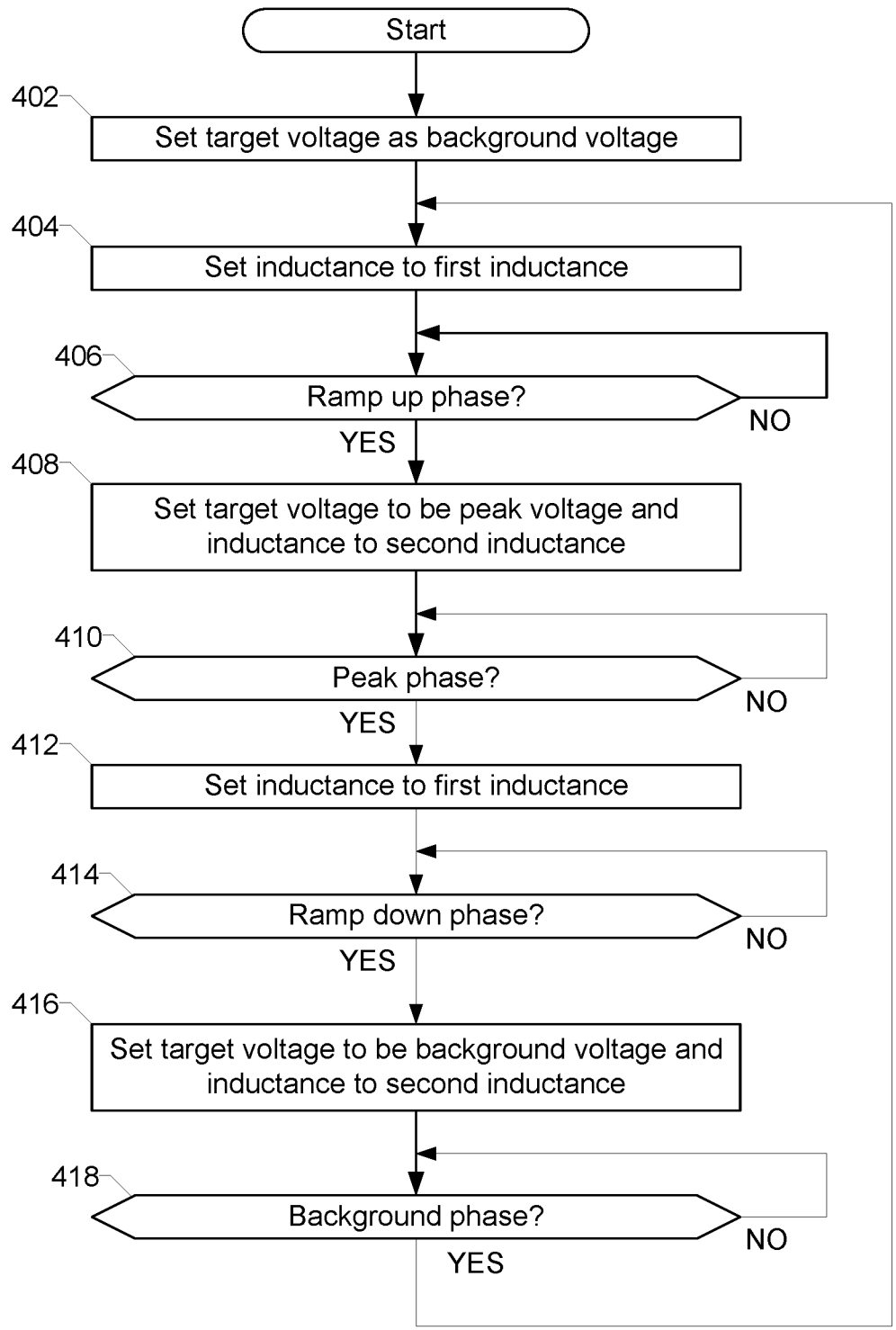
FIG. 4 is a flow chart representative of example machine readable instructions which may be executed to implement the welding-type power supply of FIG. 1 to control pulse welding.

FIG. 4 is a flow chart representative of example machine readable instructions 400 which may be executed to implement the welding-type power supply 12 of FIG. 1 to control pulse welding. While executing the example instructions 400, the example control circuitry 22 controls the power conversion circuitry 20 on a substantially continuous basis (e.g., by iteratively executing one or more control loops) to output the voltage and current based on a target voltage and/or an inductance. The example instructions 400 are described below with reference to the system 10 of FIG. 1 and the waveforms of FIG. 2.

At block 402, the control circuitry 22 sets a target voltage (e.g., for a voltage-controlled control loop) to a background voltage (e.g., the background voltage 216 of FIG. 2). Blocks 402 and 404 may implement the background phase 208. At blocks 404, the control circuitry 22 sets an inductance as a first inductance.

At block 406, the control circuitry 22 determines whether a ramp up phase 210 has started. For example, the background phase 208 may occur for a certain duration and/or the ramp up phase 210 may occur at a predetermined frequency. If the ramp up phase 210 has not begun (block 406), control returns to block 406 to continue the background phase 208. If the ramp up phase 210 has begun (block 406), at block 408 the control circuitry 22 sets the target voltage to be the peak voltage (e.g., the peak voltage 218 of FIG. 2) and sets the inductance to be a second inductance. The example control circuitry 22 may instantaneously change the target voltage (e.g., instead of ramping the target voltage over time). The second inductance may be higher, lower, or the same as the first inductance. For example, the second inductance may be selected based on a contact-tip-to-work-distance, the desired heat input, the desired dwell time at the peak voltage (e.g., the duration at which the output voltage was within a threshold voltage of the peak voltage), based on the performance of past pulse cycles, an output voltage at an end of the peak phase, an actual dwell time, a voltage overshoot and/or undershoot of the peak voltage and/or the background voltage, and/or any other factors.

At block 410, the control circuitry 22 determines whether a peak phase 212 has started. For example, the peak phase 212 may start a certain time after the start of the ramp up phase 210, and/or when the current and/or voltage reach predetermined thresholds. If the peak phase 212 has not started (block 410), control returns to block 410 to continue the ramp up phase 210.

When the peak phase 212 has begun (block 410), at block 412 the control circuitry 22 sets the inductance to the first inductance. At block 414, the control circuitry 22 determines whether a ramp down phase 214 has started. For example, the ramp down phase 214 may start a certain time after the start of the peak phase 212. If the ramp down phase 214 has not started (block 414) control returns to block 414 to continue the peak phase 212.

When the ramp down phase 214 has begun (block 414), at block 416 the control circuitry 22 sets the target voltage to be the background voltage 216 and sets the inductance to be the second inductance. The example control circuitry 22 may instantaneously change the target voltage (e.g., instead of ramping the target voltage over time). In some examples, the control circuitry 22 may set the inductance to be a third inductance that is different than the first and second inductances. At block 418, the control circuitry 22 determines whether a background phase 208 has started. For example, the background phase 208 may start a certain time after the start of the ramp down phase 214, and/or when the current and/or voltage reach predetermined thresholds. If the background phase 208 has not started (block 418), control returns to block 418 to continue the ramp down phase 210.

When the background phase 208 has started (block 418), control returns to block 404 to continue to the next pulse cycle. The example instructions 400 may iterate for the duration of the pulse welding process.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application-specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
    power conversion circuitry configured to convert input power to welding-type power; and
    control circuitry configured to control the power conversion circuitry to output the welding-type power in a plurality of pulse cycles, each pulse cycle comprising a background phase, a ramp up phase, a peak phase, and a ramp down phase, wherein the controlling the power conversion circuitry comprises:
        during the background phase of the pulse cycles, controlling the power conversion circuitry in a voltage-controlled mode using a background voltage as a target voltage;
        during the ramp up phase of the pulse cycles, controlling the power conversion circuitry in the voltage-controlled mode by using a peak voltage as the target voltage during the ramp up phase;
        during the peak phase of the pulse cycles, controlling the power conversion circuitry in the voltage-controlled mode using the peak voltage as the target voltage; and
        during the ramp down phase of the pulse cycles, controlling the power conversion circuitry in the voltage-controlled mode by using the background voltage as the target voltage during the ramp down phase.

2. The welding-type system as defined in claim 1, wherein the control circuitry is configured to change the target voltage from the background voltage to the peak voltage at the start of the ramp up phase.

3. The welding-type system as defined in claim 1, wherein the control circuitry is configured to change the target voltage from the peak voltage to the background voltage at the start of the ramp down phase.

4. The welding-type system as defined in claim 1, wherein the control circuitry is configured to control the power conversion circuitry in the voltage-controlled mode by controlling the power conversion circuitry based on comparing an output voltage of the power conversion circuitry to the target voltage.

5. The welding-type system as defined in claim 1, wherein the control circuitry is configured to:
control the power conversion circuitry using a first output inductance during the peak phase and the background phase; and
control the power conversion circuitry using a second output inductance during the ramp up phase and the ramp down phase.

6. The welding-type system as defined in claim 5, wherein the second output inductance is higher than the first output inductance.

7. The welding-type system as defined in claim 5, wherein the second output inductance is lower than the first output inductance.

8. The welding-type system as defined in claim 5, wherein the control circuitry is configured to adjust the second output inductance based on at least one of an output voltage at an end of the peak phase, a time at which the output voltage was within a threshold voltage of the peak voltage during the peak phase, or a voltage overshoot of the peak voltage or the background voltage.

9. The welding-type system as defined in claim 5, wherein the control circuitry is configured to:
control the power conversion circuitry using the first output inductance by controlling an output current based on a first relationship between an output voltage of the power conversion circuitry and rate of output current change; and
control the power conversion circuitry using the second output inductance by controlling an output current based on a second relationship between the output voltage of the power conversion circuitry and the rate of output current change.

10. A welding-type system, comprising:
power conversion circuitry configured to convert input power to welding-type power; and
control circuitry configured to control the power conversion circuitry to output the welding-type power in a plurality of pulse cycles, each pulse cycle comprising a background phase, a ramp up phase, a peak phase, and a ramp down phase, wherein the controlling the power conversion circuitry comprises controlling the power conversion circuitry in a voltage-controlled mode by changing a target voltage based on which of the background phase, the ramp up phase, the peak phase, or the ramp down phase of the pulse cycle is being controlled to one of a background voltage or a peak voltage at a given time.

11. A method for pulse welding, the method comprising:
controlling, via control circuitry, power conversion circuitry to convert input power to output welding-type power in a plurality of pulse cycles, each pulse cycle comprising a background phase, a ramp up phase, a peak phase, and a ramp down phase, wherein the controlling the power conversion circuitry comprises:
during the background phase of the pulse cycles, controlling the power conversion circuitry in a voltage-controlled mode using a background voltage as a target voltage;
during the ramp up phase of the pulse cycles, controlling the power conversion circuitry in the voltage-controlled mode by using a peak voltage as the target voltage during the ramp up phase;
during the peak phase of the pulse cycles, controlling the power conversion circuitry in the voltage-controlled mode using the peak voltage as the target voltage; and
during the ramp down phase of the pulse cycles, controlling the power conversion circuitry in the voltage-controlled mode by using the background voltage as the target voltage during the ramp down phase.

12. The method as defined in claim 11, wherein changing the target voltage to the peak voltage occurs at the start of the ramp up phase.

13. The method as defined in claim 11, wherein changing the target voltage to the background voltage occurs at the start of the ramp down phase.

14. The method as defined in claim 11, wherein controlling the power conversion circuitry in the voltage-controlled mode comprises controlling the power conversion circuitry based on comparing an output voltage of the power conversion circuitry to the target voltage.

15. The method as defined in claim 11, wherein controlling the power conversion circuitry comprises:
controlling the power conversion circuitry using a first output inductance during the peak phase and the background phase; and
controlling the power conversion circuitry using a second output inductance during the ramp up phase and the ramp down phase.

16. The method as defined in claim 15, wherein the second output inductance is higher than the first output inductance.

17. The method as defined in claim 15, wherein the second output inductance is lower than the first output inductance.

18. The method as defined in claim 15, further comprising adjusting the second output inductance based on at least one of an output voltage at an end of the peak phase, a time at which the output voltage was within a threshold voltage of the peak voltage during the peak phase, or a voltage overshoot of the peak voltage or the background voltage.

19. The method as defined in claim 15, wherein controlling the power conversion circuitry using the first output inductance comprises controlling an output current based on a first relationship between an output voltage of the power conversion circuitry and rate of output current change, and controlling the power conversion circuitry using the second output inductance comprises controlling an output current based on a second relationship between the output voltage of the power conversion circuitry and the rate of output current change.

* * * * *